United States Patent [19]
Batterman et al.

[11] Patent Number: 5,262,623
[45] Date of Patent: Nov. 16, 1993

[54] METHOD AND APPARATUS FOR DISTINGUISHING A PREFERRED BAR CODE OR THE LIKE

[75] Inventors: Eric P. Batterman, Flemington; Donald G. Chandler, Princeton, both of N.J.

[73] Assignee: Omniplanar, Inc., Princeton, N.J.

[21] Appl. No.: 754,781

[22] Filed: Sep. 4, 1991

[51] Int. Cl.⁵ .................... G06K 7/10; G06K 19/06
[52] U.S. Cl. ..................... 235/454; 235/494
[58] Field of Search ............... 235/454, 462, 494, 382

[56] References Cited

U.S. PATENT DOCUMENTS

| | | | |
|---|---|---|---|
| 4,736,109 | 4/1988 | Dvorzsak | 235/494 X |
| 4,776,464 | 10/1988 | Miller et al. | 235/462 X |
| 4,939,354 | 7/1990 | Priddy et al. | 235/456 |
| 4,958,064 | 9/1990 | Kirkpatrick | 234/384 |
| 5,128,526 | 7/1992 | Yoshida | 234/494 |

*Primary Examiner*—Constantine Hannaher
*Assistant Examiner*—Edward J. Glick
*Attorney, Agent, or Firm*—Allan Jacobson

[57] ABSTRACT

A bar code reader utilizing a two dimensional image capture optical system, includes a method and apparatus for distinguishing a preferred bar code out a plurality of bar codes within the field of view of the bar code reader. The method and apparatus for distinguishing a preferred bar code includes placing a special pattern proximate to the bar code to be distinguished. In one embodiment, a predetermined pattern at a predetermined location and orientation relative to the bar code is placed on a label. The reader includes means for detecting the presence of the predetermined pattern after the bar code has been located. The bar code reader first locates each of the plurality of bar codes, and then checks each located bar code to determine whether the predetermined pattern is present. If the predetermined pattern is detected, then the corresponding located bar code is scanned and decoded as the preferred bar code.

25 Claims, 6 Drawing Sheets

METHOD AND APPARATUS FOR DISTINGUISHING A PREFERRED BAR CODE OR THE LIKE

FIELD OF THE INVENTION

The invention relates to an improved method and apparatus for distinguishing a preferred bar code.

DESCRIPTION OF RELATED ART

Many applications of bar coding have the problem of distinguishing and reading a single desired bar code on an item that has multiple bar codes. An item may have bar codes applied at different times, by different organizations, or for different purposes such as serial number, item type, and age. For example, in a mail sorting system, a forwarding label containing a bar code representing the forwarding destination which is adhesively applied to the package already containing a label with a bar code representing the original destination. If an item has more than one bar code, it is up to the operator to locate and scan (read) the correct one. Only hand held bar code readers can be used by an operator to selectively locate and scan (read) a bar code when there are multiple bar codes present. Items with multiple bar codes create a problem for conveyor belt bar code readers, since prior art conveyor belt bar code readers can not be pointed at a specific bar code and therefore read any bar code that is in the field of view. In the case of an item with multiple bar codes, a conveyor belt bar code reader may read all of the bar codes, providing undesirable data to the system connected to the bar code reader. Some applications that use bar coding for identification place a new bar code on an item each time there is a change in identification required. With prior art conveyor belt readers, it is critical that either the old bar code be removed, or the new bar code entirely cover the old bar code to prevent erroneous readings.

In prior art bar code symbologies and readers, bar codes and the like have been described with predetermined locator targets (see U.S. Pat. No. 4,874,936 to Chandler, et al, and U.S. Pat. No. 4,958,064 to Kirkpatrick). Prior art bar code readers with locator targets were developed because bar codes were difficult to locate. However, these prior art readers can only locate and read bar codes with the predetermined locator targets. This severe limitation makes readers relying on a locator target useless to the enormous installed base of standard bar code symbologies (Code 39, Code 128, Codabar, UPC, etc.) which do not have a predetermined locator target.

SUMMARY OF THE INVENTION

The present invention is embodied in a method and apparatus for distinguishing a preferred bar code for use with two dimensional area capture based bar code readers. Distinguishing a preferred bar code enables a bar code reader to only decode the bar code specifically of interest when there may be many bar codes presented to the field of view of a bar code reader.

A method and apparatus for distinguishing a preferred bar code in accordance with the present invention includes placing a special pattern proximate to the bar code to be distinguished. In one embodiment, the invention includes a predetermined pattern at a predetermined location and orientation relative to the bar code on a label, and means for detecting the presence of the predetermined pattern after the bar code has been located. The bar code reader first locates the bar codes, and then checks each located bar code to determine whether the predetermined pattern is present. If the predetermined pattern is detected, then the corresponding located bar code is scanned and decoded as the preferred bar code.

The predetermined pattern contains a plurality of light and dark marks of predetermined size and spacing (i.e. frequency) in both the vertical and horizontal directions relative to the bar code. In an alternate embodiment of the present invention, the predetermined pattern may have differing horizontal and vertical frequencies to provide for greater discrimination between the predetermined pattern and any background printing.

DETAILED DESCRIPTION

Figure 7:
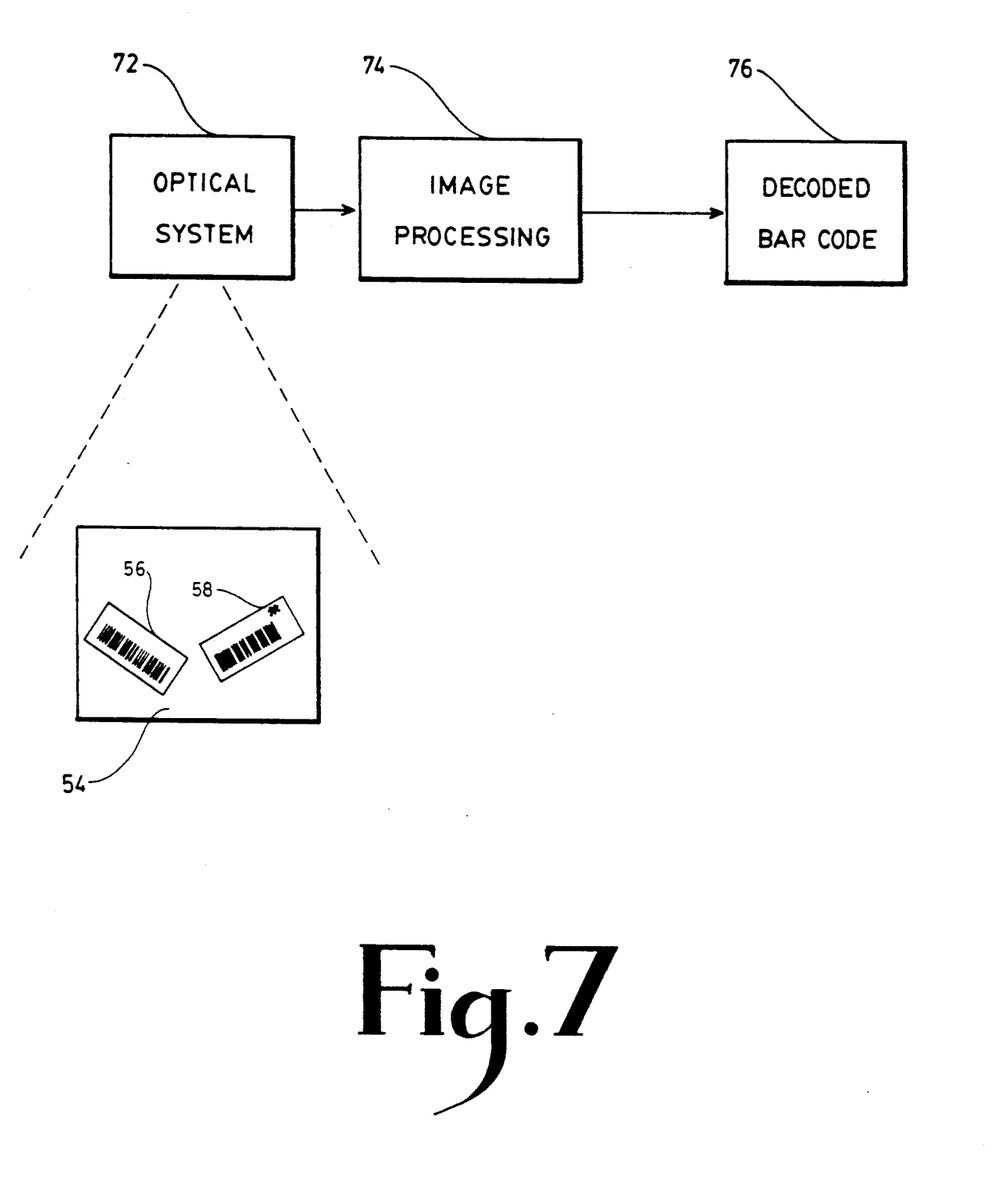
FIG. 7 is a block diagram of a bar code reader system in accordance with the present invention.

As shown in FIG. 7, a system for reading bar codes includes an optical system 72 for capturing a two dimensional image of label 54 likely to contain one or more bar codes 56, 58. The image processing system 74 distinguishes bar code 58 from bar code 56 on the basis of a special pattern placed proximate to the bar code of interest 58 and provides a decoded bar code output 76 corresponding to bar code 58.

Figure 1A:
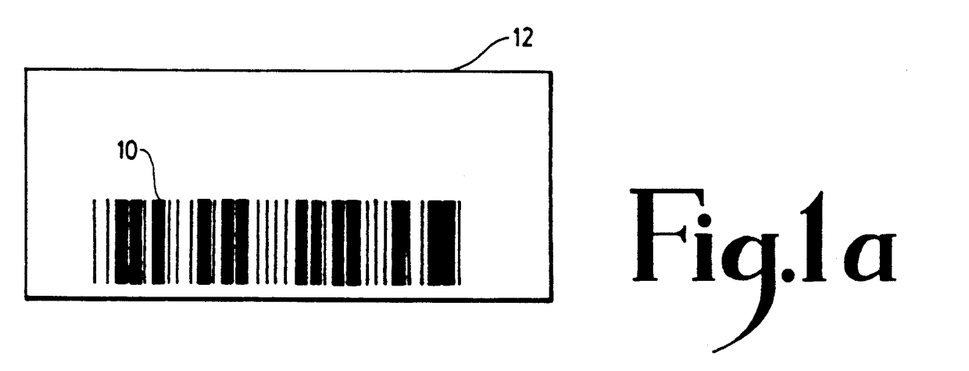
FIG. 1A is an illustration of a label with a width modulated bar code which may be used in conjunction with the present invention.
Figure 1B:
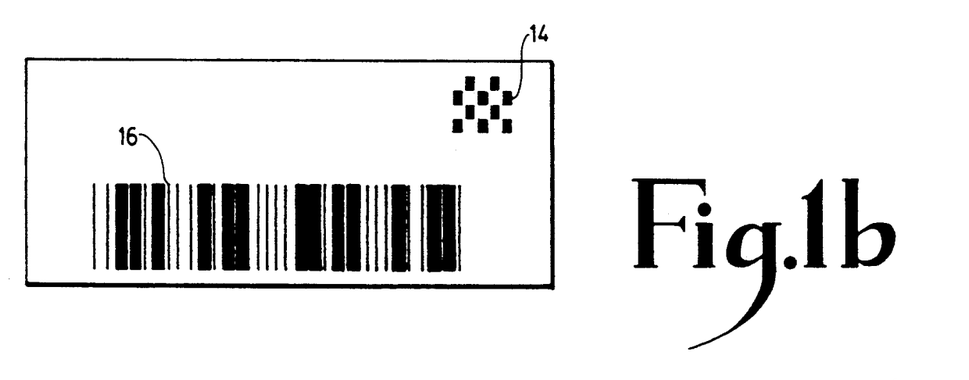
FIG. 1B is an illustration of a label with a predetermined pattern at a predetermined location and orientation relative to a width modulated bar code label in accordance with the present invention.
Figure 1C:
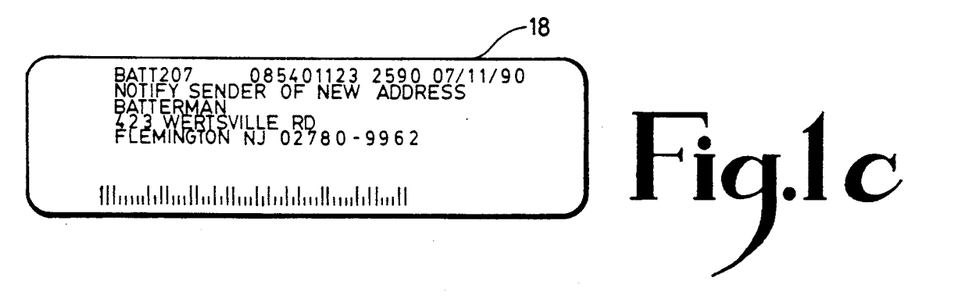
FIG. 1C is an illustration of a label with a height modulated bar code which may be used in conjunction with the present invention.
Figure 1D:
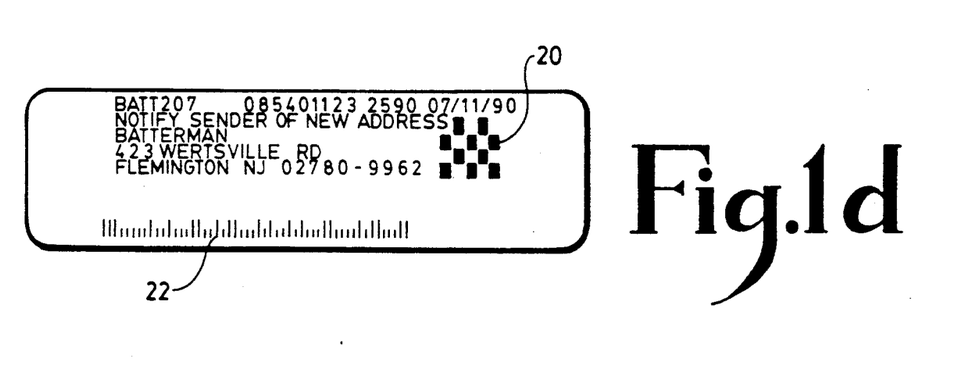
FIG. 1D is an illustration of a label with a predetermined pattern at a predetermined location and orientation relative to a height modulated bar code label, in accordance with the present invention.
Figure 2A:
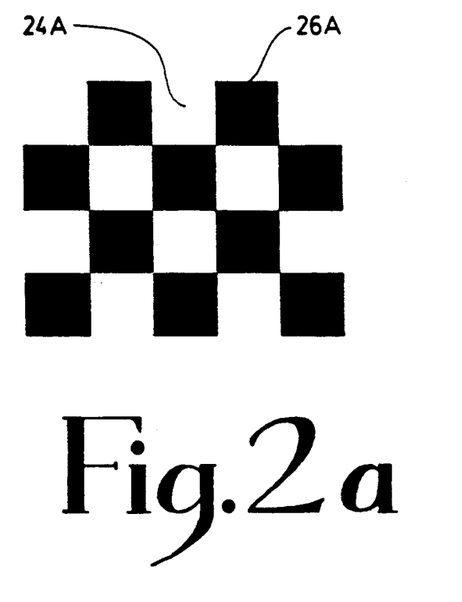
FIGS. 2A, 2B, 2C, and 2D are illustrations of various predetermined patterns which may be used in conjunction with the present invention.
Figure 2B:
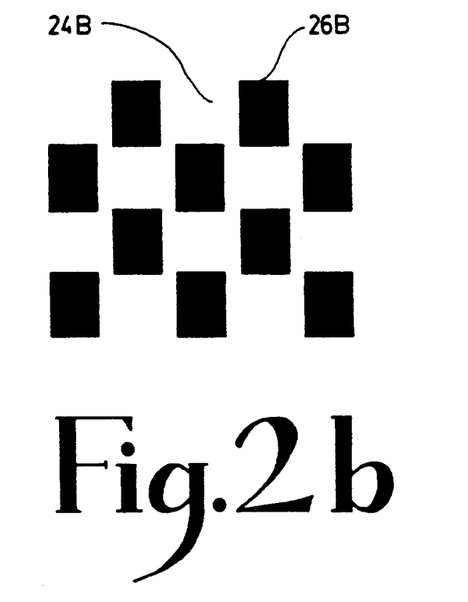
Figure 2C:
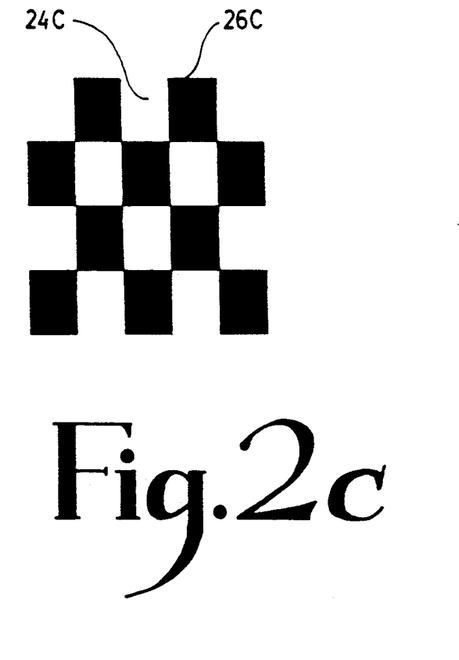
Figure 2D:
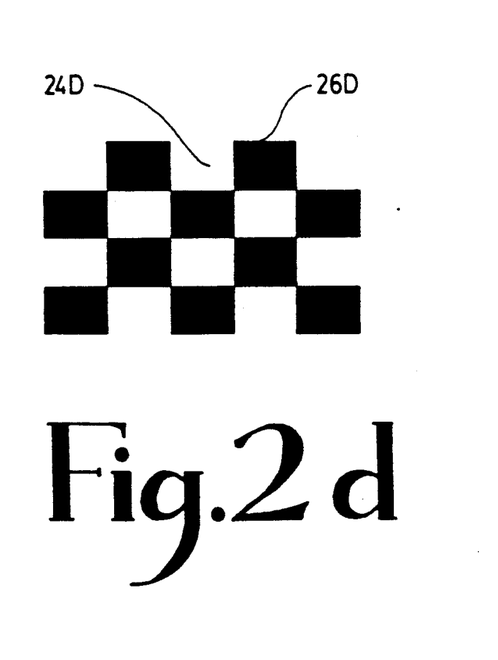

Bar Code 10 is shown on label 12 in FIG. 1A. FIG. 1B shows a label similar to FIG. 1A with a predetermined optically detectable pattern 14 located at a predetermined location and orientation relative to bar code 16, in accordance with the present invention. This predetermined pattern 14 is designed to be rapidly and accurately recognized. The predetermined pattern 14 is positioned at a predetermined location relative to the bar code 16. A sample of an unmodified United States Postal Service POSTNET Computer Forwarding System (CFS) label 18 is shown in FIG. 1C. A sample of a CFS label article modified in accordance with the present invention is shown in FIG. 1D, with the predetermined pattern 20 located at a predetermined location and orientation relative to POSTNET bar code 22. Both the CFS label and the POSTNET code used by the U.S. Post Office are well known to those skilled in the art. See Publication 25 published by the U.S. Post Office.

Bar code readers employing two dimensional image processing typically capture a two dimensional image of an area containing a bar code. The readers locate and then decode any bar codes that are found. The process of recognizing the predetermined pattern occurs after the location steps but before the decode step. The bar code reader checks all located bar codes for the presence of the predetermined pattern. If a pattern is recognized, the associated bar code is decoded, and any other bar codes on a given item are ignored. The process of locating and decoding a bar code stored in a digital image memory is described in detail in the pending Patent Applications "IMPROVED METHOD AND APPARATUS FOR A HIGH SPEED OMNIDIRECTIONAL BAR CODE READER" Ser. No: 500802, filed: Mar. 28, 1990, abandoned, "DUAL PROCESSOR OMNIDIRECTIONAL BAR CODE READER WITH DUAL MEMORY FOR BAR CODE LOCATION AND ORIENTATION", Ser. No: 502411, filed Mar. 28, 1990, abandoned, and "OMNIDIRECTIONAL BAR CODE READER WITH METHOD AND APPARATUS FOR DETECTING AND SCANNING A BAR CODE SYMBOL", Ser. No: 501259, filed Mar. 28, 1990, now U.S. Pat. No. 5,155,343.

Examples of the predetermined pattern of the present invention are shown in FIG. 2. The predetermined optically detectable pattern is comprised of a plurality of rows of alternating light spaces 24A and dark marks 26A at a predetermined frequency. The dark marks 26A in FIG. 2A are shown in a "checkerboard" formation, i.e. dark marks touching at the corners. However, the marks 26A may be marks which do not touch each other, as shown by marks 26B in FIG. 2B. Marks may have the same frequency in the horizontal and vertical direction. However, the spatial frequency of the marks in the horizontal direction may be different from the spatial frequency of the marks in the vertical direction. FIGS. 2A and 2B show marks which have the same horizontal and vertical frequency. FIG. 2C illustrates a predetermined pattern in which the horizontal frequency is greater than the vertical frequency. FIG. 2D illustrates a predetermined pattern in which the horizontal frequency less than the vertical frequency. Different horizontal and vertical frequencies can provide greater discrimination between the predetermined pattern and any background printing. Marks such as 24(A-D) and 26(A-D) may be solid rectangular shapes as shown, or any other shape, such as a printed asterisk.

Figure 3:
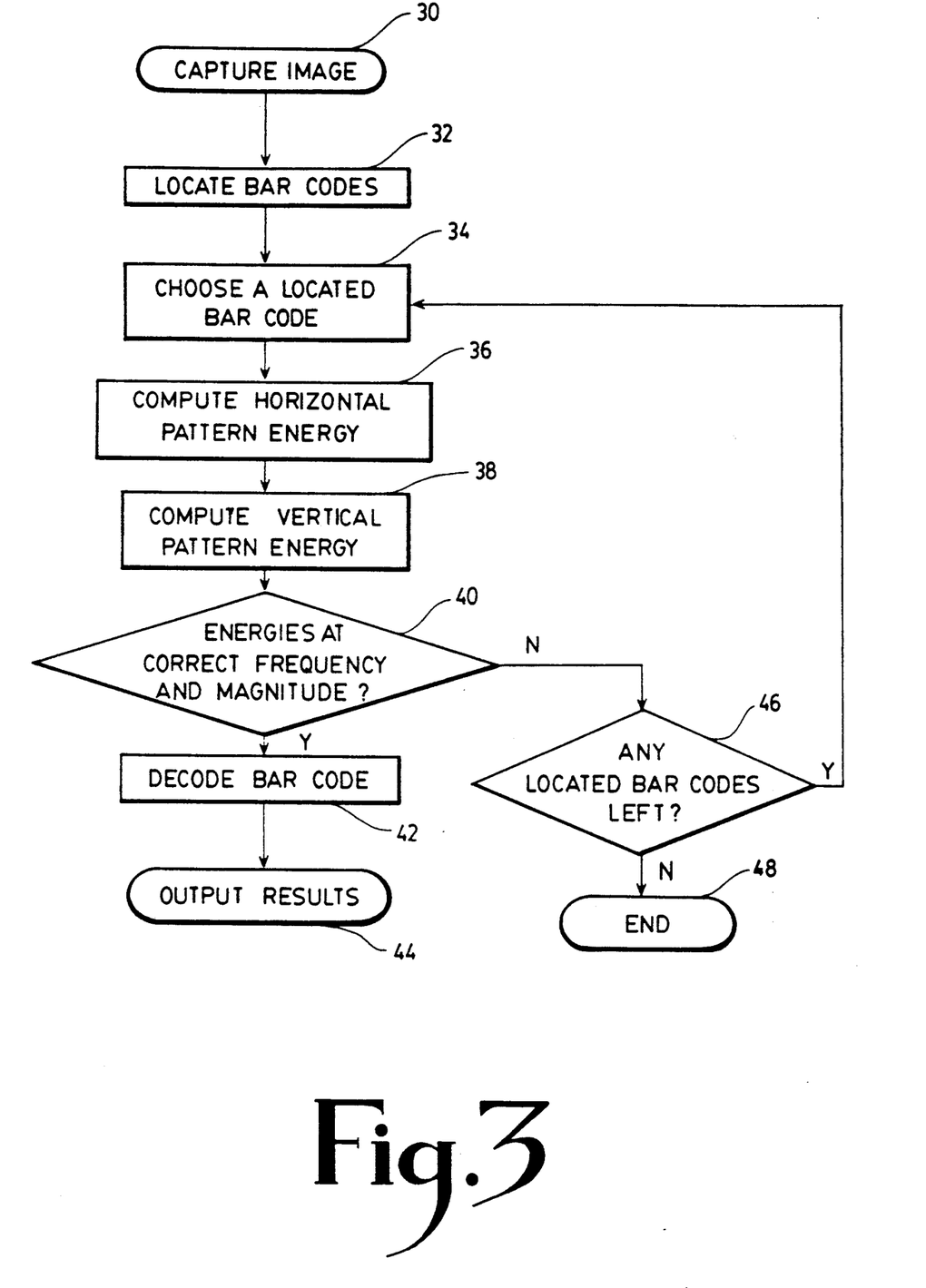
FIG. 3 is a flow chart illustrating the operation of a bar code reader using a predetermined pattern to distinguish a preferred bar code in accordance with the present invention.

After a bar code is located, the area at a predetermined location relative to the located bar code is checked for the presence of the predetermined pattern. FIG. 3 is a representative flow chart of the operation of the method of the invention. In step 30, an image of the area potentially containing a plurality of bar codes is captured. The image is processed to locate any bar codes in step 32. Starting at step 34, each located bar code is then checked for the presence of the locator pattern by computing the horizontal pattern energy 36, the vertical pattern energy 38, and determining if the computed energies are at the predetermined frequency and of sufficient magnitude in step 40. If energies of the predetermined frequency and magnitude are found, the bar code associated with the predetermined pattern is decoded in step 42 and the results are output in step 44. All other bar codes found are then ignored. If a predetermined pattern was not detected in step 40, and there are more located bar codes left in step 46, the next located bar code is checked in step 34. The order in which the located bar codes are checked for the predetermined pattern can be determined by the strength of the locating score (as provided by some locating methods), the order in which bar codes were located, or by other means, or arbitrarily. If at step 46 no more located bar codes are available, the process ends at step 48.

FIG. 3 illustrates only one implementation of the invention for a single frame based two dimensional bar code reader. However, there are many variations of the invention described based on the notion of a predetermined pattern proximate to any machine readable symbol. One example is a continuous web or conveyor type bar code reader where many bar codes may be present, but only bar codes with the predetermined pattern should be read. In this case, after a bar code with the predetermined pattern is detected, decoded and output, the process would return to checking all located bar codes for the predetermined pattern, along with continuously locating more bar codes. Another example of the present invention is using the predetermined pattern to distinguish a preferred bar code when it is desirable to read more than one bar code on an item, yet place special significance on one particular bar code. In all of the previous examples, if only one bar code is located in the field of view, special significance will be, given only if the predetermined pattern is detected.

Figure 4:
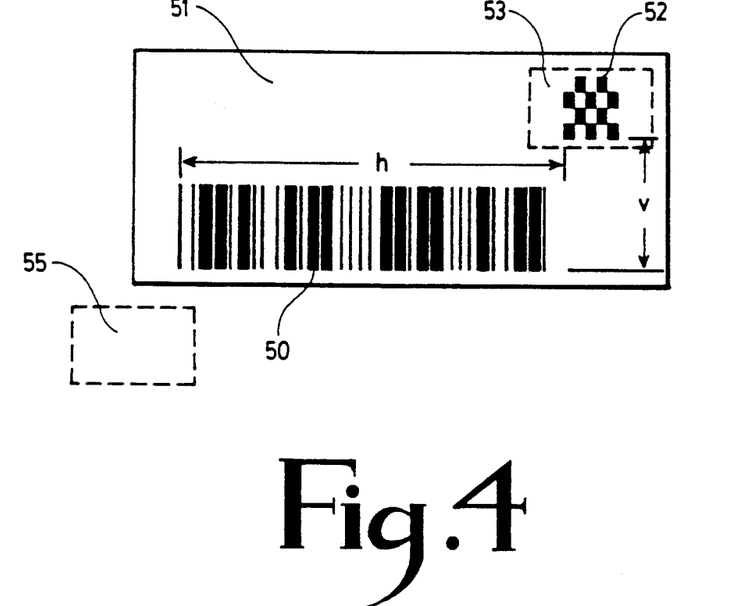
FIG. 4 is an illustration of a label with a predetermined pattern at a predetermined location and orientation relative to a width modulated bar code in accordance with the present invention.

The predetermined pattern can be at any predetermined orientation and location proximate to the bar code. In the preferred embodiment, the predetermined location is above and to the right of the bar code. FIG. 4 shows a bar code label 51 with a bar code 50 and the predetermined pattern 52. The outlined area 53 above and to the right of the bar code will be checked for the presence of the predetermined mark. This area 53 is larger than the predetermined pattern to take in to account any slight misplacement of the pattern, printing problems, and optical distortion. The area 55 below and to the left of the bar code must also be checked since robust bar code locating methods do not decode and therefore can not determine if a bar code is upside down. The terms horizontal and vertical are used only in a relative sense with regard to the predetermined pattern and the position of the predetermined pattern relative to the bar code.

In FIG. 4, the predetermined pattern 52 is located a horizontal distance h from one end of the bar code, and a vertical distance v above the bar code. The orientation of the vertical direction of the predetermined pattern is parallel to the bars of the code. The orientation of the horizontal direction of the predetermined pattern is perpendicular to the bars of the bar code.

Figure 5:
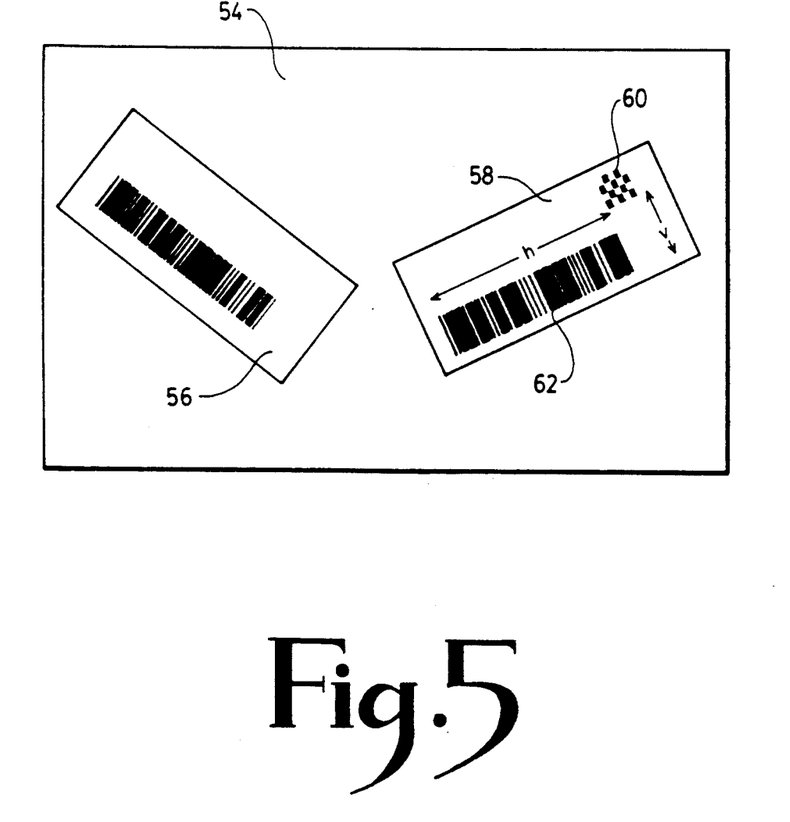
FIG. 5 is an illustration of the captured image in a bar code reader, of an article with multiple bar code labels present in accordance with the present invention.

In an omnidirectional reader, the entire bar code label can have any orientation (i.e. 0 to 360 degrees). FIG. 5 is a representative image of a captured area 54 containing more than one bar code label. Bar code label 56 does not have a predetermined pattern. Bar code label 58 has a predetermined pattern 60 located at a horizontal distance h and a vertical distance v from the bar code 62.

Figure 6:
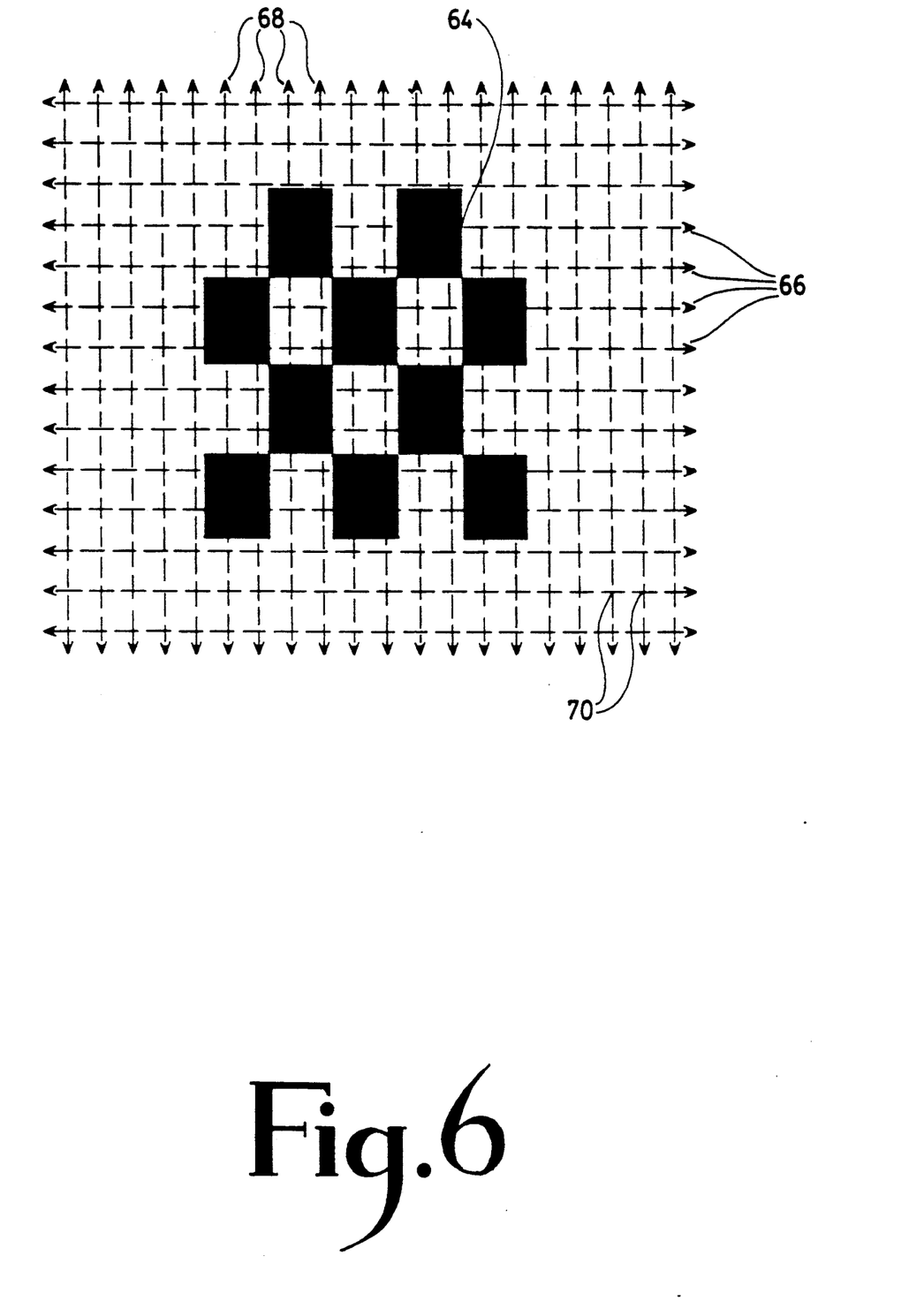
FIG. 6 is an illustration of a predetermined pattern used in conjunction with the present invention, with vertical and horizontal sampling lines indicated.

The presence of a predetermined pattern at or near the predetermined location is detected by measuring the energy at a particular set of spatial frequencies which corresponds to the spatial frequency energy generated by the alternating black marks and white spaces. FIG. 6 shows a predetermined pattern 64 with horizontal sample lines 66 and vertical sample lines 68. These sample lines may extend beyond the predetermined pattern in all directions. This extension is intended to provide some tolerance to translations from the expected position of predetermined pattern 64. Each intersection of a horizontal and vertical sample line defines a sample point 70, and it is the matrix of digital scene reflectance values corresponding to these sampling points which forms the input to the energy computations. The digitized scene preferably has resolution such that the spacing between scan lines is at least four pixels. In the event that the intersection of the scan lines falls between actual pixel samples, the reflectance value may be obtained from the nearest available pixel, or by the well known process of bilinear interpolation. Bilinear interpolation is normally needed only when the scene is digitized with less than about four pixels resolution between sampling lines.

In the preferred embodiment, vertical sample lines 68 are spaced such that there are four vertical sample lines 68 per horizontal cycle of the predetermined pattern. A horizontal cycle is defined as a black mark and a horizontally adjacent white space. Likewise, horizontal sample lines 66 are spaced such that there are four horizontal sample lines 66 per vertical cycle of the predetermined pattern. A vertical cycle is defined as a black mark and a vertically adjacent white space. When the marks have differing horizontal and vertical spacings, the vertical and horizontal sample lines will have correspondingly differing spacings. Referring to FIG. 6, the preferred embodiment of predetermined pattern 64 is considered to have 2.5 horizontal cycles and 2 vertical cycles. Thus, a sampling matrix overlaid on predetermined pattern 64 is ten sample points wide by eight sample points high.

In the preferred embodiment, a matrix thirty-two samples wide and eight samples high is used. The overextended width allows for a degree of imprecision in determining the expected horizontal position of the predetermined pattern 64. This imprecision may arise in practice when the exact starting position of the bar code has not been precisely determined. Note that the predetermined pattern detection process generally precedes bar code decoding and follows bar code location. The location step may be imprecise in locating the exact start of a bar code, and any resulting errors in detection of the predetermined pattern will be compensated by the use of overextended sampling. Conversely, the predetermined pattern need only be at a substantially predetermined location and orientation relative to the bar code. Detection method is tolerant of accumulated errors from all sources.

In the preferred embodiment, an eight point by eight point two dimensional discrete Fourier Transform (2D-DFT) of sample points overlaying the predetermined pattern 64 as previously described would show a strong concentration of energy in the $(\pm 2, \pm 2)$ bins. The energy in the $(\pm 2, \pm 2)$ bins is the sum of the energies in bins $(+2, +2)$, $(+2, -2)$, $(-2, +2)$ and $(-2, -2)$ of the 2D-DFT. This is because there are approximately two horizontal cycles in an eight long horizontal stretch of sample points and also two vertical cycles in an eight long vertical stretch of sampler points. In general, energy would be concentrated in the $(\pm x, \pm y)$ bins if there are x horizontal cycles in an eight long horizontal stretch and y vertical cycles in an eight long vertical stretch. When an eight by eight submatrix partially overlays the predetermined pattern, correspondingly less energy is concentrated in the $(\pm 2, \pm 2)$ bins of the 2D-DFT. Therefore, the eight by eight submatrix which produces highest energy concentration in bins $(\pm 2, \pm 2)$ corresponds to the position in the full thirty-two by eight matrix which best overlays the predetermined pattern 64. Energy concentration is defined as the ratio of energy in bins $(\pm 2, \pm 2)$ of the 2D-DFT to the AC energy in the 2D-DFT. AC energy is defined as the sum of the energies in all bins except bin (0,0) of the 2D-DFT. Bin (0,0) is regarded as the DC energy bin. Energy is defined as the sum of the squares of the real and imaginary parts of a 2D-DFT bin.

The energy concentration ratio is generally a more useful quantity than the bins $(\pm 2, \pm 2)$ energy used directly because by measuring concentration, a high degree of insensitivity to the absolute magnitude of the signal is received. That is, a low contrast pattern (perhaps as printed by a lightly inked ribbon) has a smaller bins $(\pm 2, \pm 2)$ energy than a high contrast pattern (perhaps as printed by a laser printer) while the two have virtually identical energy concentrations. The division by total AC energy therefore serves to effectively remove or normalize for contrast differences.

The $(\pm 2, \pm 2)$ bins of an eight by eight 2D-DFT can be computed with very high efficiency by decomposing the 2D-DFT into one dimensional DFT computations applied to the rows and columns of the matrix. This decomposition is well known in the art. Further computational efficiency is achieved by noting that only bin two of each one dimensional DFT needs to be computed. For an eight long one dimensional DFT, this computation has coefficients of only $+1$, $-1$, and 0, and can therefore be implemented with a small number (six) of add and subtract operations.

The AC energy can be efficiently computed without resorting to DFT computations by noting that AC energy in a signal is equal to total energy minus DC energy. Total energy is efficiently computed as simply the sum of the squares of all the values in the matrix. DC energy is the sum of the squares of the points minus the average value of all the points.

By efficiently computing the bins $(\pm 2, \pm 2)$ energy and the AC energy of the eight by eight submatrix, the energy concentration for the submatrix is efficiently computed. Since the 2D-DFT computations were decomposed into row and column operations, it is a simple matter to recompute the energy concentration with the submatrix shifted over one column horizontally. Seven of the eight column computations can be reused, with the first one being dropped from the concentration computations, and with a new last column being added into the concentration computations. This provides a very large computational savings over completely recomputing the energy concentration for a new eight by eight submatrix.

The energy concentration is generally used to determine the presence or absence of the predetermined pattern 64. When the concentration exceeds a certain threshold, the predetermined pattern is considered present. When the concentration is below threshold, the pattern is absent.

What is claimed is:

1. In a reading system for reading a machine readable symbol, said system having a reader, said reader having a field of view, a method for distinguishing one machine readable symbol from a plurality of machine readable symbols within said field of view of said reader, said method comprising:
   placing a predetermined pattern proximate to at least one of said plurality of machine readable symbols;
   first locating one of said machine readable symbols;
   then subsequently detecting said predetermined pattern proximate to said located machine readable symbol; and
   selecting said located machine readable symbol for decoding if said predetermined pattern is detected proximate to said located machine readable symbol.

2. A method in accordance with claim 1, wherein said predetermined pattern is placed at a subsequently predetermined location relative to said located machine readable symbol.

3. A method in accordance with claim 1, wherein said predetermined pattern is placed at a subsequently predetermined orientation relative to said located machine readable symbol.

4. A method in accordance with claim 1, wherein said machine readable symbol is a bar code.

5. A method in accordance with claim 4, wherein said bar code is a U.S. Postal Service height modulated bar code.

6. A method in accordance with claim 4, wherein said predetermined pattern has energy concentrated in a set of predetermined spacial frequencies.

7. In a reader for reading a machine readable symbol, said reader having a field of view, a method for distinguishing one machine readable symbol from a plurality of machine readable symbols within said field of view of said reader, wherein said one machine readable symbol includes a predetermined pattern proximate thereto, said method comprising:
   first locating one of said machine readable symbols;
   then subsequently detecting said predetermined pattern proximate to said located machine readable symbol; and
   selecting said located machine readable symbol for decoding if said predetermined pattern is detected proximate to said located machine readable symbol.

8. A method in accordance with claim 7, wherein said predetermined pattern is placed at a substantially predetermined location relative to said located machine readable symbol.

9. A method in accordance with claim 7, wherein said predetermined pattern is placed at a substantially predetermined orientation relative to said located machine readable symbol.

10. A method in accordance with claim 7, wherein said machine readable symbol is a bar code.

11. A method in accordance with claim 10, wherein said bar code is a U.S. Postal Service height modulated bar code.

12. A method in accordance with claim 10, wherein said predetermined pattern has energy concentrated in a set of predetermined special frequencies.

13. In a reading system for reading a machine readable symbol, said system having a reader, said reader having a field of view, an apparatus for distinguishing one machine readable symbol from a plurality of machine readable symbols within said field of view of said reader, said apparatus comprising:
   means for placing a predetermined pattern proximate to at least one of said plurality of machine readable symbols;
   means for first locating one of said machine readable symbols;
   means responsive to said locating means, for subsequently detecting said predetermined pattern proximate to said located machine readable symbol; and
   means for selecting said located machine readable symbol for decoding if said predetermined pattern is detected proximate to said located machine readable symbol.

14. An apparatus in accordance with claim 13, wherein said predetermined pattern is placed at a substantially predetermined location relative to said located machine readable symbol.

15. An apparatus in accordance with claim 13, wherein said predetermined pattern is placed at a substantially predetermined orientation relative to said located machine readable symbol.

16. An apparatus in accordance with claim 13, wherein said machine readable symbol is a bar code.

17. An apparatus in accordance with claim 16, wherein said bar code is a U.S. Postal Service height modulated bar code.

18. An apparatus in accordance with claim 16, wherein said predetermined pattern has energy concentrated in a set of predetermined spacial frequencies.

19. In a reader for reading a machine readable symbol, said reader having a field of view, an apparatus for distinguishing one machine readable symbol from a plurality of machine readable symbols within said field of view of said reader, wherein said one machine readable symbol includes a predetermined pattern proximate thereto, said apparatus comprising:
   means for first locating one of said machine readable symbols;
   means responsive to said locating means, for subsequently detecting said predetermined pattern proximate to said located machine readable symbol; and
   means for selecting said located machine readable symbol for decoding if said predetermined pattern is detected proximate to said located machine readable symbol.

20. An apparatus in accordance with claim 19, wherein said predetermined pattern is placed at a subsequently predetermined location relative to said located machine readable symbol.

21. An apparatus in accordance with claim 19, wherein said predetermined pattern is placed at a substantially predetermined orientation relative to said located machine readable symbol.

22. An apparatus in accordance with claim 19, wherein said machine readable symbol is a bar code.

23. An apparatus in accordance with claim 22, wherein said bar code is a U.S. Postal Service height modulated bar code.

24. An apparatus in accordance with claim 22, wherein said predetermined pattern has energy concentrated in a set of predetermined spacial frequencies.

25. In a reader system for reading a plurality of machine readable symbols, wherein said reader system includes means for locating each of said machine readable symbols, an improvement comprising:
   a predetermined pattern placed proximate to at least one of said plurality of machine readable symbols; and
   means responsive to said predetermined pattern for distinguishing said at least one of said plurality of machine readable symbols.

* * * * *